US012715113B2

(12) United States Patent
Jiang et al.

(10) Patent No.: US 12,715,113 B2
(45) Date of Patent: Aug. 25, 2026

(54) CONTROL SYSTEM AND DRIVE CIRCUIT BOARD FOR AIDING MECHANICAL ARM TO ESCAPE

(71) Applicant: TECHMAN ROBOT INC., Taoyuan City (TW)

(72) Inventors: Yu-Chin Jiang, Taoyuan City (TW); Ting-Ya Hsiao, Taoyuan City (TW); Chun-Wen Lai, Taoyuan City (TW)

(73) Assignee: TECHMAN ROBOT INC., Taoyuan City (TW)

( * ) Notice: Subject to any disclaimer, the term of this patent is extended or adjusted under 35 U.S.C. 154(b) by 228 days.

(21) Appl. No.: 18/418,387

(22) Filed: Jan. 22, 2024

(65) Prior Publication Data

US 2025/0128408 A1 Apr. 24, 2025

(30) Foreign Application Priority Data

Oct. 19, 2023 (TW) ................................ 112140138

(51) Int. Cl.
*B25J 9/16* (2006.01)
*G05B 15/02* (2006.01)

(52) U.S. Cl.
CPC .............. *B25J 9/161* (2013.01); *G05B 15/02* (2013.01)

(58) Field of Classification Search
CPC . B25J 9/161; B25J 9/1674; B25J 13/00; B25J 19/06; B25J 9/16; G05B 15/02
See application file for complete search history.

(56) References Cited

U.S. PATENT DOCUMENTS

| | | | | |
|---|---|---|---|---|
| 9,293,916 | B2 * | 3/2016 | Binder | G09B 19/00 |
| 2018/0093376 | A1 * | 4/2018 | Teranaka | B25J 19/0029 |
| 2018/0152056 | A1 * | 5/2018 | Takahashi | H02P 27/06 |
| 2019/0079532 | A1 * | 3/2019 | Crawley | B25J 11/008 |
| 2022/0063102 | A1 * | 3/2022 | Higashi | B25J 9/161 |
| 2022/0200317 | A1 * | 6/2022 | Nagata | H02J 7/96 |
| 2023/0294310 | A1 * | 9/2023 | Lee | B60L 3/0092 |
| 2025/0018580 | A1 * | 1/2025 | Cronin | B25J 13/06 |

* cited by examiner

*Primary Examiner* — Adam R Mott
*Assistant Examiner* — Sagar KC
(74) *Attorney, Agent, or Firm* — WPAT, PC

(57) ABSTRACT

A control system of a mechanical arm is provided. The control system includes a first transform circuit, a second transform circuit and a third transform circuit. The first transform circuit outputs a first digital power signal in a first mode of the mechanical arm. The second transform circuit outputs a second digital power signal in the first mode of the mechanical arm. When the control system is unable to control the mechanical arm to move in the first mode, the second digital power signal is cut off. When the control system is unable to control the mechanical arm to move in the first mode, the third transform circuit outputs a third digital power signal.

6 Claims, 7 Drawing Sheets

CONTROL SYSTEM AND DRIVE CIRCUIT BOARD FOR AIDING MECHANICAL ARM TO ESCAPE

This application claims the benefit of Taiwan application Serial No. 112140138, filed Oct. 19, 2023, the subject matter of which is incorporated herein by reference.

BACKGROUND OF THE INVENTION

Field of the Invention

The invention relates in general to a control system and a drive circuit board, and more particularly to a control system and a drive circuit board for aiding a mechanical arm to escape, so that the mechanical arm can restore normal operation.

Description of the Related Art

During work operation, a mechanical arm may easily enter a dead center (or dead point) due to a collision or an abnormal operation by an operator. When getting stuck in the dead center, the mechanical arm cannot proceed to the next movement or withdraw back to the position of previous movement. The mechanical arm is simply stuck and cannot move at all.

To resolve the above problems, the present invention provides a control system and a drive circuit board for aiding a mechanical arm to escape, so that the operator can safely move the mechanical arm off the dead center.

SUMMARY OF THE INVENTION

The invention is related to a control system and a drive circuit board for aiding a mechanical arm to escape, wherein it determines whether the mechanical arm needs to escape according to power status.

According to a first aspect of the present invention, a control system and a drive circuit board for aiding a mechanical arm to escape are provided, wherein the timing for releasing each brake are staggered, so that the power consumption for escape can be reduced.

According to a second aspect of the present invention, a control system and a drive circuit board for aiding a mechanical arm to escape are provided, wherein the rotation speed of the motor module is monitored, and the braking force is appropriately adjusted, so that the operator can safely move the mechanical arm off the dead center (or dead point).

To achieve the above objects of the present invention, the control system of a mechanical arm includes a first transform circuit, a second transform circuit and a third transform circuit. The first transform circuit outputs a first digital power signal in a first mode of the mechanical arm. The second transform circuit outputs a second digital power signal in the first mode of the mechanical arm. When the control system is unable to control the mechanical arm to move in the first mode, the second digital power signal is cut off. When the control system is unable to control the mechanical arm to move in the first mode, the third transform circuit outputs a third digital power signal.

In some embodiments, the control system controls the mechanical arm to operate in the first mode according to the first digital power signal and the second digital power signal; the control system cuts off the second digital power signal so that the mechanical arm is controlled to operate in the second mode; the control system controls the mechanical arm to operate in the third mode according to the third digital power signal and adjusts the braking force of a joint module.

In some embodiments, the control system includes a decoder, a calculator and a computing circuit. The decoder receives a sensing signal, decodes the sensing signal, then outputs a decoded signal. The calculator is coupled to the decoder for receiving the decoded signal and generating a speed signal according to the decoded signal. The computing circuit is coupled to the calculator for receiving the speed signal and comparing the speed signal with a speed threshold signal to generate a speed computing signal.

To achieve the above objects of the present invention, the drive circuit board of a mechanical arm includes a first power circuit, a second power circuit and a third power circuit. The first power circuit transmits a first power. The second power circuit transmits a second power. The mechanical arm moves in a first mode according to the first power and the second power. When the mechanical arm is unable to move in the first mode, the second power is cut off. When the mechanical arm is unable to move in the first mode, the third power circuit transmits a third power.

In some embodiments, in the first mode and the second mode, the first power circuit and the second power circuit are coupled to a first power supply; in the third mode, the third power circuit is coupled to a second power supply.

In some embodiments, each joint module of the mechanical arm includes a drive circuit board, on which a controller is disposed. When the mechanical arm moves in the first mode, the controller controls the braking force of the mechanical arm according to the second power. When the mechanical arm moves in the third mode, the controller controls the braking force of the mechanical arm according to the third power.

In some embodiments, when the mechanical arm is unable to move in the first mode, the controller controls the mechanical arm to change from the first mode to the second mode, an operator connects the third power circuit with a second power supply, and after the controller controls the joint module to release brake according to the third power, the operator guides the mechanical arm to move.

DETAILED DESCRIPTION OF THE INVENTION

The above and other aspects of the invention will become better understood with regard to the following detailed description of the preferred but non-limiting embodiment(s). The following description is made with reference to the accompanying drawings.

Figure 1:
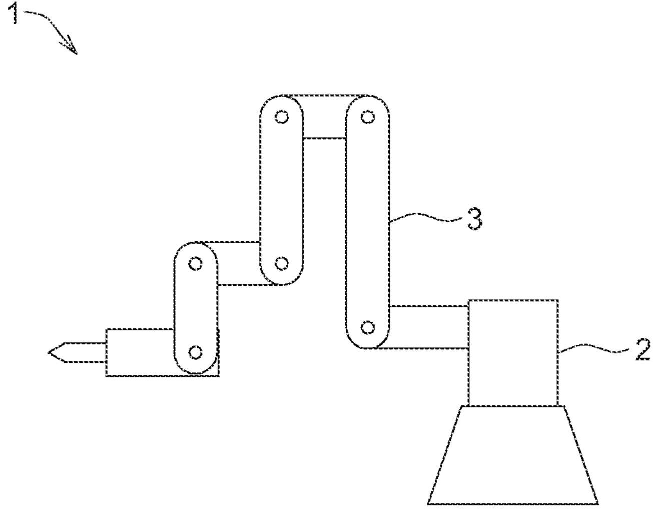
FIG. 1 is a schematic diagram of a mechanical arm of the present invention.
Figure 2:
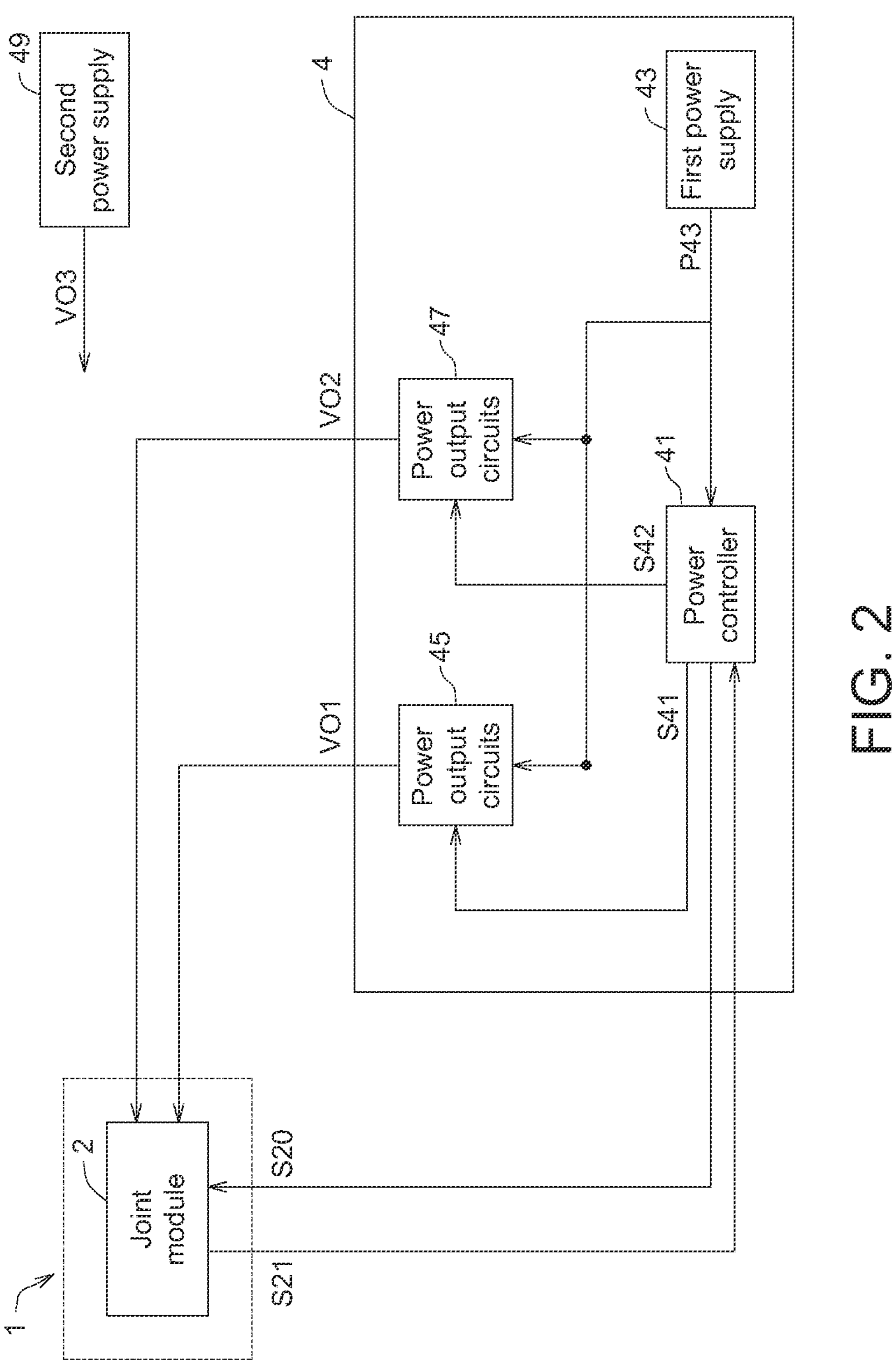
FIG. 2 is a schematic diagram of a mechanical arm, a control box and a second power supply of the present invention.

Referring to FIG. 1, a schematic diagram of a mechanical arm of the present invention is shown. As indicated in FIG. 1, the mechanical arm 1 includes a plurality of joint modules 2 and a plurality of axis arms 3. Starting from the base, the joint modules 2 are connected to the base and the axis arms 3 in series to form a mechanical arm 1. The terminal end of the mechanical arm 1 can be equipped with several kinds of tools for executing different tasks. Referring to FIG. 2, a schematic diagram of a mechanical arm, a control box and a second power supply of the present invention is shown. As indicated in FIG. 2, although the mechanical arm 1 includes several joint modules 2, only one joint module 2 is illustrated for explanatory purpose. When a control box 4 and a second power supply 49 are coupled to the mechanical arm 1, a power is provided to the mechanical arm 1. The internal of the control box 4 includes a first power supply 43. The second power supply 49 of FIG. 2 is disposed in the external of the control box 4. When the mechanical arm 1 and the control box 4 form a set of equipment, the first power supply 43 can be referred as the internal power of the set of equipment, and the second power supply 49 can be referred as the external power of the set of equipment. The second power supply 49 can also be disposed in the internal of the control box 4, and such change is allowed.

Refer to FIG. 2 again. The control box 4 outputs a first power VO1 and a second power VO2 to each joint module 2 of the mechanical arm 1. At the beginning, since the second power supply 49 is not yet coupled to the mechanical arm 1, the status between the second power supply 49 and the mechanical arm 1 being an open-circuited or a short-circuited can be used as a basis for detecting the status of the mechanical arm 1. For instance, when the second power supply 49 is coupled to the mechanical arm 1, this indicates that the mechanical arm 1 is in a particular status (such as in a stuck status); conversely, when the second power supply 49 is not coupled to the mechanical arm 1, this indicates that the mechanical arm 1 is not stuck, and the second power supply 49 can output a third power VO3 to each joint module 2. Moreover, when the mechanical arm 1 is driven, the first power VO1 and the second power VO2 are respectively used as a power source for transmitting signals and performing various movements. For instance, the first power VO1 can be used to generate a 5V control signal (such as S77 of FIG. 3), or the second power VO2 can be used to drive a motor module 53 of FIG. 3 for rotating the joint module 2 and eventually enabling the terminal end of the mechanical arm 1 to move in three axial directions (X, Y, Z).

The control box 4 includes a power controller 41 and a plurality of power output circuits 45 and 47. The first power supply 43 is coupled to the power controller 41 and the power output circuits 45 and 47. The first power supply 43 outputs a first supply voltage P43 to the power controller 41 and the power output circuits 45 and 47. When the power controller 41 detects that the first supply voltage P43 is in a normal status, the power controller 41 outputs a plurality of power control signals S41 and S42 to control the power output circuits 45 and 47 to generate the first power VO1 and the second power VO2, respectively.

Figure 3:
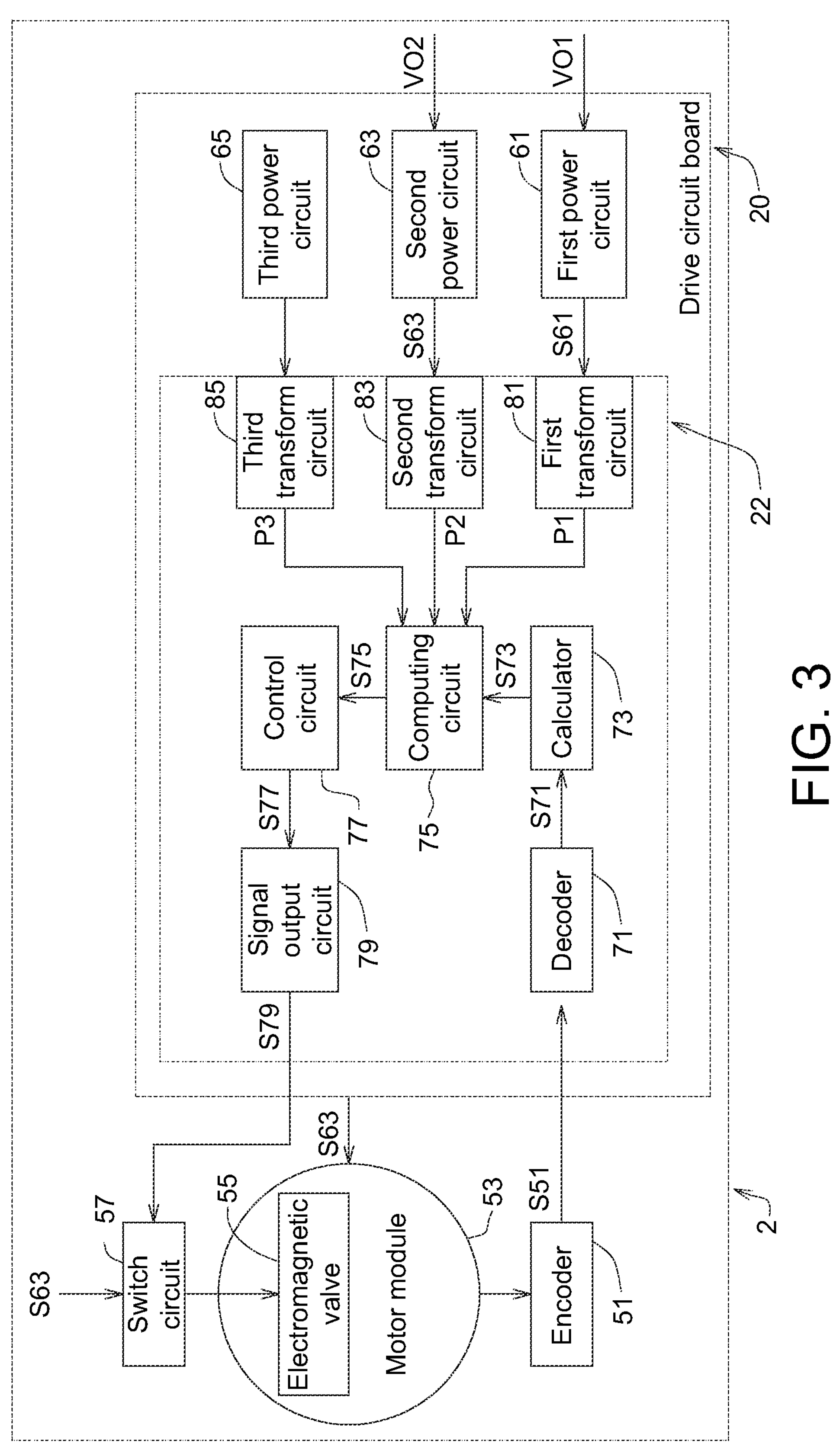
FIG. 3 is a first schematic diagram of a joint module coupled to a power supply of the present invention.

Referring to FIG. 3, a first schematic diagram of a joint module coupled to a power supply of the present invention is shown. As indicated in the diagram, the joint module 2 receives the first power VO1 and the second power VO2, that is, the joint module 2 is coupled to the power output circuits 45 and 47 of FIG. 2. In other words, the joint module 2 is coupled to the first power supply 43 of FIG. 2. Therefore, the mechanical arm 1 can perform multiple kinds of movements in a first mode according to the first power supply 43, wherein the first mode can be a normal mode, that is, the mechanical arm 1 can normally perform various pre-programmed tasks or paths.

The joint module 2 includes a first power circuit 61 and a second power circuit 63, wherein the first power circuit 61 and the second power circuit 63 are coupled to the power output circuits 45 and 47 of FIG. 2 for receiving the first power VO1 and the second power VO2, respectively. Thus, the first power circuit 61 and the second power circuit 63 respectively transmit the first power VO1 and the second power VO2, and then output a first analog power S61 and a second analog power S63 for enabling the operation of the mechanical arm 1. That is, the mechanical arm 1 moves in the first mode according to the first power VO1 and the second power VO2. Moreover, each joint module 2 of the mechanical arm 1 includes a drive circuit board 20, on which a controller 22 is disposed. The drive circuit board 20 is coupled to the first power supply 43 of the control box 4, so that the first power circuit 61 and the second power circuit 63 of the drive circuit board 20 receive the first power VO1 and the second power VO2 and control a switch circuit 57 according to the first power VO1 and the second power VO2 to determine whether the motor module 53 is in a brake status and whether the motor starts to rotate according to the second power VO2.

Refer to FIG. 3 again. When the mechanical arm 1 is in a normal mode (that is, the first mode), the drive circuit board 20 and the second power supply 49 form an open-circuit, that is, the third power circuit 65 and the second power supply 49 form an open-circuit. Also, the drive circuit board 20 includes a controller 22 coupled to the encoder 51, the motor module 53, the switch circuit 57, the first power circuit 61, the second power circuit 62 and the third power circuit 65. When the mechanical arm 1 is in the first mode, the switch circuit 57 transmits the second power VO2, and the switch circuit 57 is coupled to an electromagnetic valve 55 for controlling the braking force of the electromagnetic valve 55 according to the second power VO2. In other words, the controller 22 can adjust the status of the switch circuit 57 for controlling the braking force of the joint module 2 according to the second power VO2. The controller 22 can be a micro controller unit (MCU). When flowing through the switch circuit 57, the second power VO2 releases the electromagnetic valve 55, that is, releases the brake status. Conversely, when the second power VO2 is cut off, the electromagnetic valve 55 activates the brake status.

The encoder 51 is coupled to the motor module 53 for monitoring the movement status of the motor. For instance, after monitoring the rotation speed, the encoder 51 generates a sensing signal S51. Thus, the controller 22 receives the sensing signal S51, and controls a power path of the switch circuit 57 according to the sensing signal S51 for adjusting the rotation speed of the motor module 53 to adjust the movement speed of the mechanical arm 1, so that the operator's safety can be assured. In other words, the switch circuit 57 conducts or cut off the power path according to the speed computing signal S75. The power path of the switch circuit 57 is a path through which the second power VO2 and the third power VO3 are transmitted. The switch circuit 57 can be a transistor, a switch, or a combination of multiple elements. The controller 22 includes a first transform circuit 81, a second transform circuit 83 and a third transform circuit 85, which are respectively coupled to the first power circuit 61, the second power circuit 63 and the third power circuit 65 for receiving the first analog power S61 and the second analog power S63. The transform circuits 81, 83, 85 can be an analog to digital convertor (ADC). Besides, since whether the third power circuit 65 outputs a third analog power S65 to the third transform circuit 85 is determined according to the status of the mechanical arm 1, the third analog power S65 is not illustrated in the embodiment of FIG. 3. For instance, if the mechanical arm 1 moves normally (such as the normal mode) without getting stuck at a dead center position (or dead point position), this indicates that the controller 22 of the mechanical arm 1 is not yet connected to an external power (that is, is not connected to the second power supply 49). Conversely, if the mechanical arm 1 gets stuck at a dead center position and needs to escape from it (that is, in an escape mode), the controller 22 needs to be connected to an external power for receiving the third analog power S65 of FIG. 4. Thus, the joint module 2 of the present invention determines whether the mechanical arm 1 enters the escape mode according to the power status. Moreover, the position or gesture at which the mechanical arm 1 gets stuck at the dead center (or dead point) can be obtained with reference to the embodiment of FIG. 1, and the application of the present invention is not limited to any specific position or gesture of the stuck.

Figure 4:
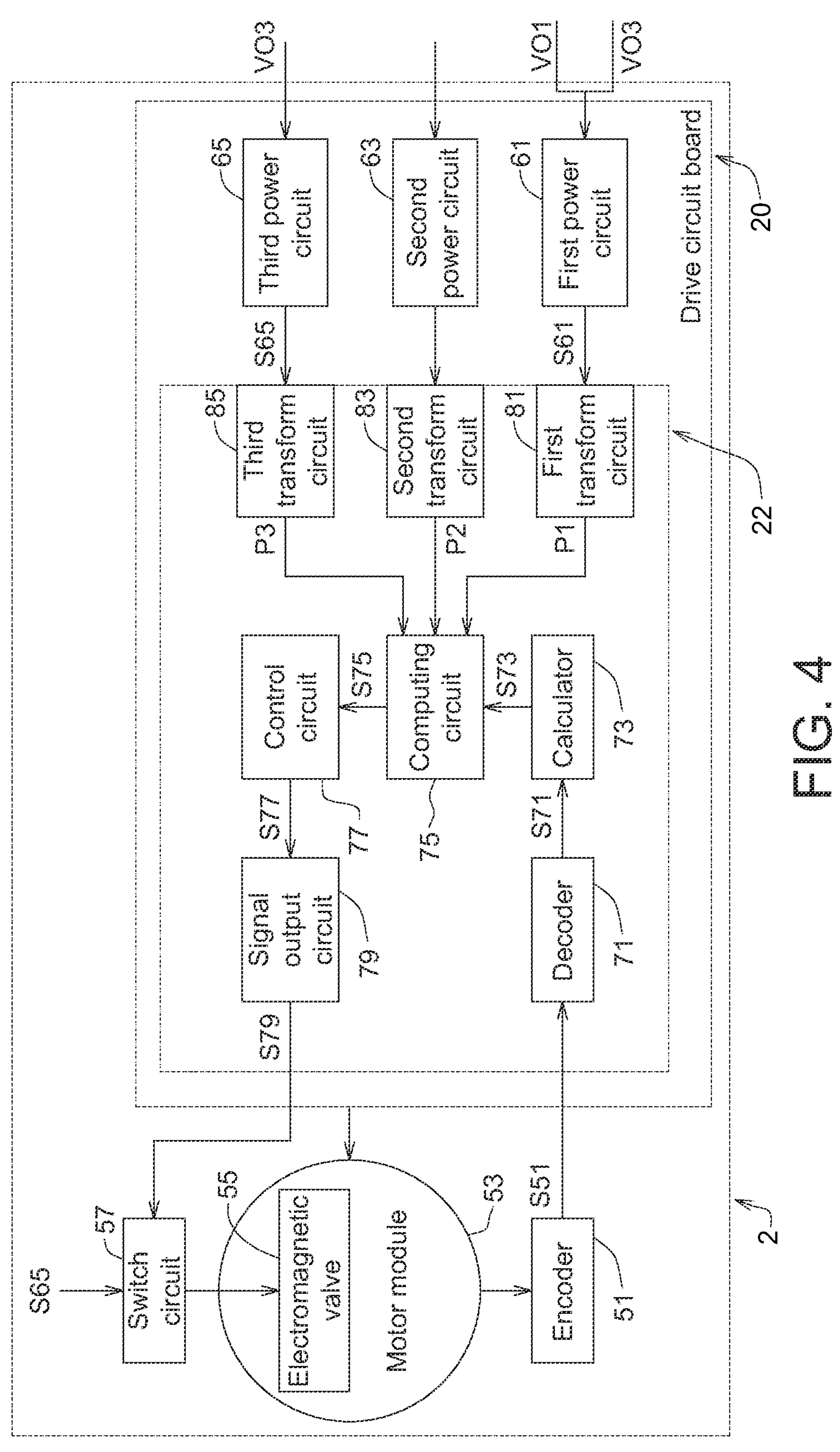
FIG. 4 is a second schematic diagram of a joint module coupled to a power supply of the present invention.

When the mechanical arm 1 moves in the first mode, the second mode and the third mode, a first transform circuit 81, a second transform circuit 83 and a third transform circuit 85 respectively convert the first analog power S61, the second analog power S63 and the third analog power S65 to a first digital power signal P1, a second digital power signal P2 and a third digital power signal P3 of FIG. 4. A computing circuit 75 of the controller 22 is coupled to the three transform circuits 81, 83, 85 for performing computing according to respective power threshold signal to determine whether the status of the three digital power signals P1, P2, P3 are normal and detect whether the third digital power signal P3 exists or not. The computing circuit 75 can be a comparator and can be selectively integrated to the internal of the control circuit 77. In other words, the controller 22 can detect whether the joint module 2 is connected to the second power supply 49. When the computing circuit 75 computes the power, a computing signal S75 related to the power (that is, power computing signal) is generated; when the computing circuit 75 computes the rotation speed, a computing signal S75 related to the speed (that is, speed computing signal) is generated. For instance, the decoder 71 of the controller 22, coupled to the encoder 51, receives a sensing signal S51, decodes (or interprets) the sensing signal S51, and then generates a decoded signal S71 to a calculator 73.

The calculator 73 receives the decoded signal S71 to generate a speed signal S73. The computing circuit 75 compares the speed signal S73 with a speed threshold signal to generate a computing signal S75 related to the motor speed (that is, the speed computing signal). Thus, the controller 22 generates the control signal S77 according to the speed computing signal S75. The controller 22 is coupled to a signal output circuit 79 for outputting the control signal S77 to the signal output circuit 79, wherein the signal output circuit 79 can be a buffer. The signal output circuit 79 generates a switch signal S79 to the switch circuit 57 according to the control signal S77 for conducting or cutting off the power path. Thus, the control circuit 77 controls the braking force of the electromagnetic valve 55 according to the sensing signal S51. The switch signal S79 at high level conducts the power path of the switch circuit 57; the switch signal S79 at low level cuts off the power path of the switch circuit 57; the switch signal S79 at other levels can adjust the degree of conduction such as ½ or ⅓ of conduction. In other words, the switch circuit 57, coupled to the signal output circuit 79, receives the switch signal S79 for conducting or cutting off the power path.

Referring to FIG. 4, a second schematic diagram of a joint module coupled to a power supply of the present invention is shown. As indicated in FIG. 4, when the controller 22 detects that the rotation speed and position of the motor module 53 are different from the design or programming content outputted by the control box 4 (such as S20 of FIG. 2) according to the sensing signal S51, the controller 22 determines that the mechanical arm 1 is unable to operate normally and transmits an abnormality signal S21 (as indicated in FIG. 2) to the power controller 41 of the control box 4, and the power controller 41 cuts off the second power VO2 of the second power circuit 63; or, the said operation can all be performed by the power controller 41. That is, the control circuit 77 is coupled to the computing circuit 75 for controlling the mechanical arm 1 to convert from the first mode to the second mode according to the speed computing signal S75 and cutting off the output of the second digital power signal P2.

In other words, the controller 22 notifies the control box 4 to cut off the output of the second power VO2, therefore the second power VO2 and the second analog power S63 are not designated in the embodiment of FIG. 4. That is, the second transform circuit 83 is connected to the first power supply 43 through the second power circuit 63, but there is no electrical transmission (voltage and current) between the said elements. Meanwhile, the control box 4 (or the controller 22) controls the mechanical arm 1 to stop operation and enter a second mode (that is, safe mode). Namely, in the first mode and the second mode, the first power circuit 61 and the second power circuit 63 are coupled to the first power supply 43, and the first power circuit 61, the second power circuit 63 and the third power circuit 65 form an open-circuit with the second power supply 49.

In other words, if the operator finds that the mechanical arm 1 enters a dead center and is unable to proceed with subsequent movements and that the control box 4 (or the controller 22) is unable to control the mechanical arm 1 to return to the position of previous movement. That is, the mechanical arm 1 gets the stuck and is unable to move (or work, keep, or operate) in the first mode, the control circuit 77 cuts off the second power VO2, then the operator couples the second power supply 49 to the third power circuit 65 of the joint modules 2. Thus, when the mechanical arm 1 is unable to move (or work, keep, or operate) in the first mode, the third power circuit 65 transmits the third power VO3. That is, the third power circuit 65 is coupled to the second power supply 49 for making the mechanical arm 1 entering a third mode. Meanwhile, after the computing circuit 75 determines that the third power VO3 exists, the control circuit 77 controls the mechanical arm 1 to move (or work, keep, or operate) in the third mode (that is, escape mode). In other words, the control circuit 77 is coupled to the computing circuit 75 for controlling the mechanical arm 1 to convert (or change) from the second mode to the third mode according to the power computing signal S75.

Besides, in the embodiment of FIG. 4, since the control box 4 is not shut down first and activated later, the supply of the first power VO1 continues and the first power VO1 and the third power VO3 are transmitted to the first power circuit 61 in parallel. The first power VO1 and the third power VO3 are designed to have an identical voltage drop. Moreover, since the supply of the first power VO1 continues, the required time for the mechanical arm 1 to escape from the dead center will be reduced. Since the second power VO2 is already cut off, the joint modules 2 is now powered by the third power VO3 instead, and the braking force of the electromagnetic valve 55 is adjusted by the third analog power S65 (that is, the third power VO3) instead. The required energy for a motor to operate is originally supplied by the second analog power S63 (referring to FIG. 3). However, for the safety of the operator and the mechanical arm 1, the power supply from the third analog power S65 (referring to FIG. 4-5) to the motor is cut off in the escape mode. For instance, the diagram illustrates only wire connection without power designation. In other words, when the mechanical arm 1 moves in the first mode, the controller 22 controls the braking force of the mechanical arm 1 according to the second power VO2; when the mechanical arm 1 moves in the third mode, the controller 22 controls the braking force of the mechanical arm 1 according to the third power VO3. Besides, the circuit design between the motor, the second power circuit 63 and the third power circuit 65 is not subjected to the restrictions of the present invention and therefore is not elaborated here.

In the above embodiment, the operator manually connects the second power supply 49 with the drive circuit board 20 of the joint module 2. However, the above process can be designed and programmed as an in-built escape function stored in the control box 4 (or the controller 22). For instance, the second power supply 49 and the drive circuit board 20 can be connected by another switch circuit (or switch). Thus, when the controller 22 determines, according to the sensing signal S51, that the mechanical arm 1 is in an abnormal status or is unable to move, the controller 22 can enter the third mode (escape mode) and conduct the power path between the second power supply 49 and the drive circuit board 20, so that the mechanical arm 1 can escape as well. Thus, the required power connected with the mechanical arm 1 by the operator manually for escaping the dead center and the required power conducted to the mechanical arm 1 by the control box 4 for escaping the dead center are both within the scope of the present invention.

Figure 5:
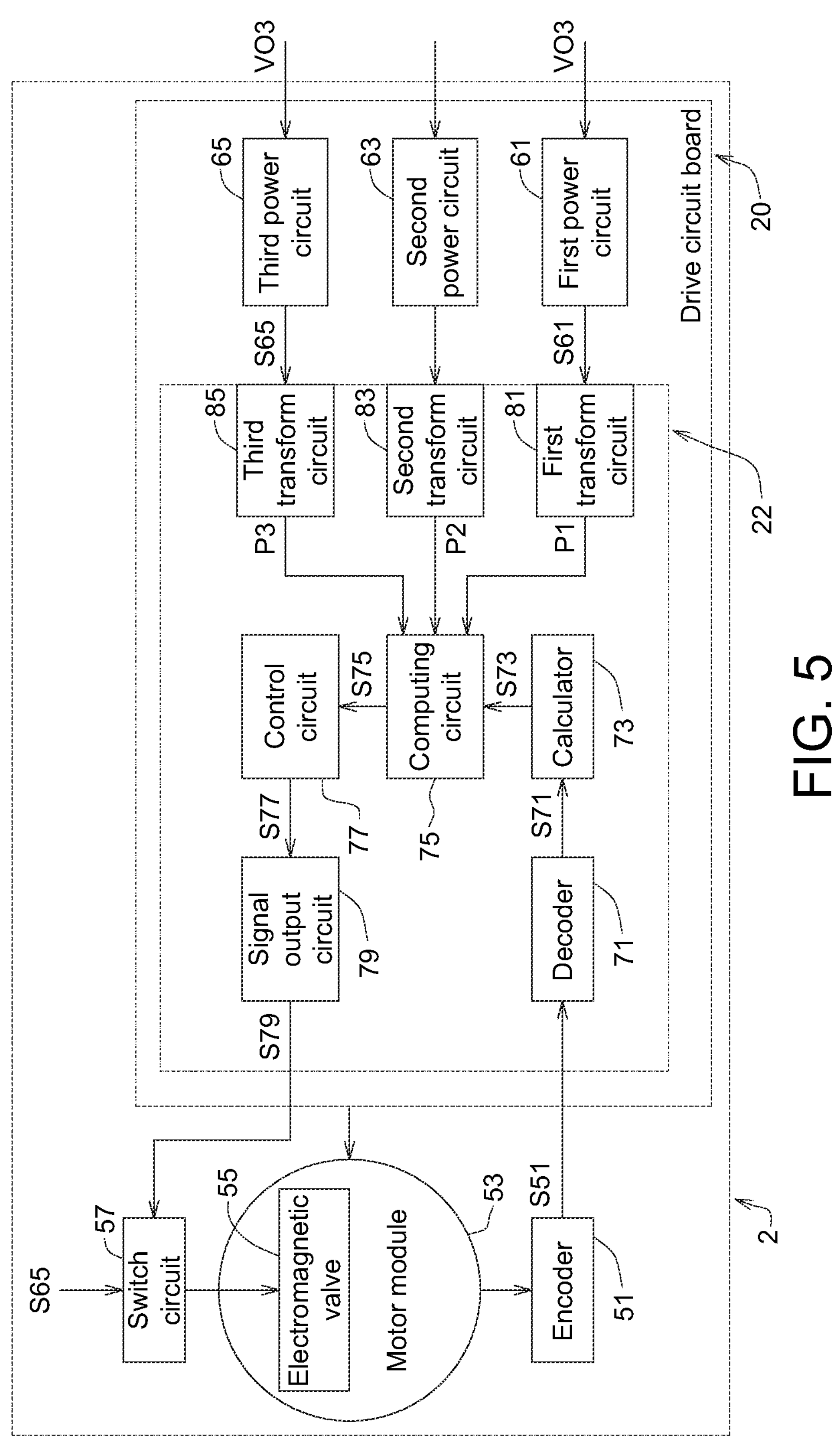
FIG. 5 is a third schematic diagram of a joint module coupled to a power supply of the present invention.

Referring to FIG. 5, a third schematic diagram of a joint module coupled to a power supply of the present invention is shown. As indicated in the diagram, the input of the first power circuit 61 is not connected with the first power VO1 and the third power VO3 in parallel, and only the third power VO3 is transmitted to the first power circuit 61. In other words, the control box 4 is already shut down, and according to the initial setting of the electromagnetic valve 55, when no power is provided, the motor module 53 (or electromagnetic valve 55) is in a brake status and the mechanical arm 1 stops moving. Therefore, the required energies for the joint modules 2 and the mechanical arm 1 to transmit signal and move in the third mode (escape mode) are both provided by the second power supply 49. The third power VO3 provides the required energy to the power path of the switch circuit 57 and the required energy for the electromagnetic valve 55 of the motor module 53 to operate. The required time for the mechanical arm 1 to resume operation is longer because this method needs to wait for signal initialization and the establishment of communication connection.

Figure 6:
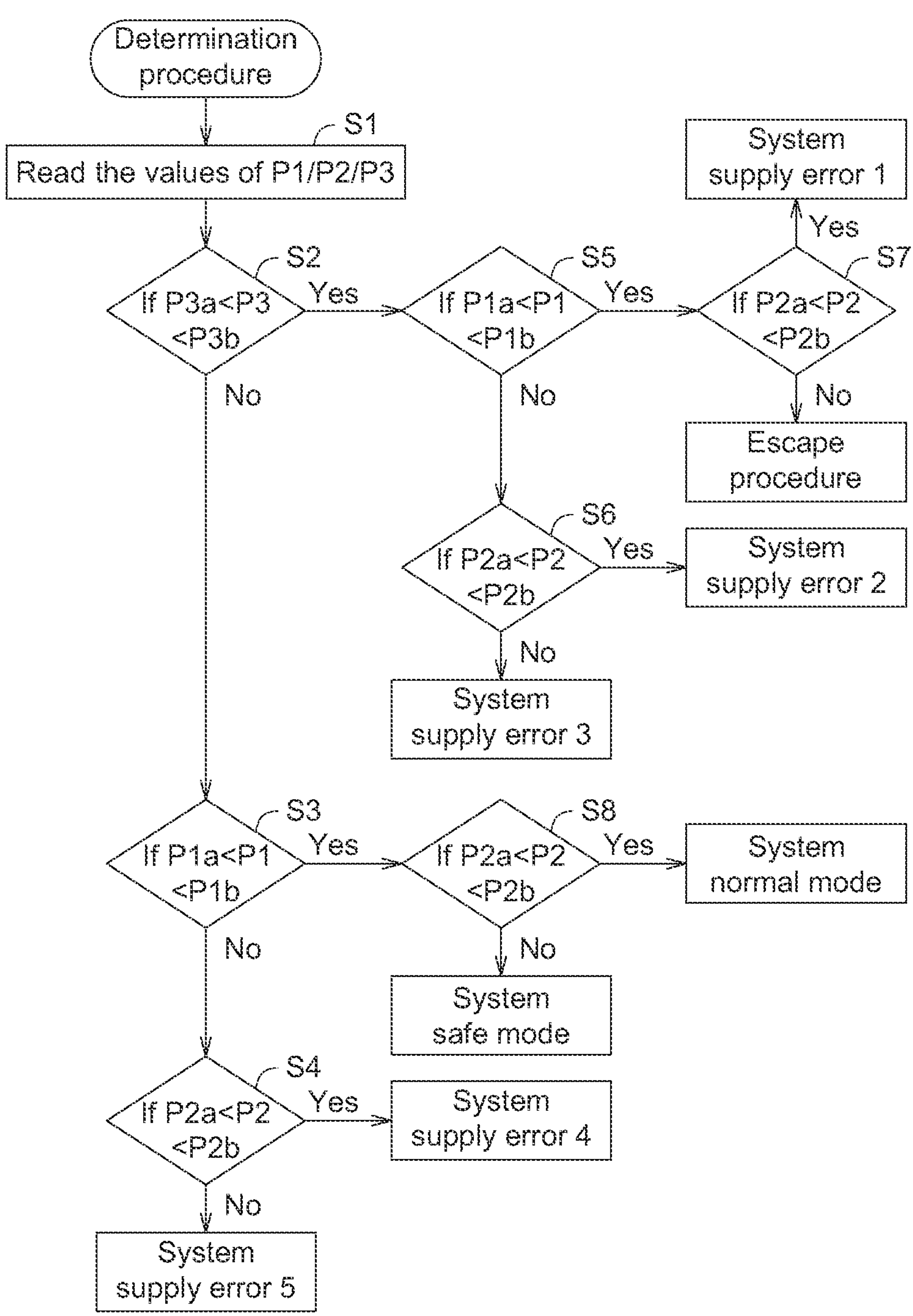
FIG. 6 is a flowchart of a determination procedure of the present invention for determining whether a mechanical arm needs to escape.

Referring to FIG. 6, a flowchart of a determination procedure of the present invention for determining whether a mechanical arm needs to escape is shown. Refer to the flowchart. In step S1, the values of the first digital power signal P1, the second digital power signal P2 and the third digital power signal P3 are read by the computing circuit 75. In step S2, whether the third digital power signal P3 is between the power threshold signal P3*a* and the power threshold signal P3*b* is determined through a comparison: if the determination is negative, the procedure proceeds to step S3. In step S3, whether the first digital power signal P1 is between the power threshold signal P1*a* and the power threshold signal P1*b* is determined through a comparison: if the determination is negative, the procedure proceeds to step S4. In step S4, whether the second digital power signal P2 is between the power threshold signal P2*a* and the power threshold signal P2*b* is determined through a comparison: if the determination is negative, this indicates that two or three power statuses of the entire control system are abnormal, and such abnormalities pertain to system power supply error 5. The control system may include a controller 22, a first power circuit 61, a second power circuit 63 and a third power circuit 65 and may additionally include a control box 4. Moreover, each joint module 2 of the mechanical arm 1 includes a control system; if the control system does not include the control box 4, the control system can be disposed in the drive circuit board 20. When system power supply error occurs, the control system can perform detection or shut down the system for repair, but the details are not elaborated here.

In step S4, if it is determined that the second digital power signal P2 is between the power threshold signal P2*a* and the power threshold signal P2*b*, this indicates that one power status of the control system is abnormal, and such abnormality pertains to system power supply error 4.

In step S3, if it is determined that the first digital power signal P1 is between the power threshold signal P1*a* and the power threshold signal P1*b*, the procedure proceeds to step S8. In step S8, whether the second digital power signal P2 is between the power threshold signal P2*a* and the power threshold signal P2*b* is determined through a comparison; if the determination is negative, this indicates that the mechanical arm 1 stops movement and enters a system safe mode. In step S8, if it is determined that the second digital power signal P2 is between the power threshold signal P2*a* and the power threshold signal P2*b*, this indicates that all three power statuses of the control system are normal and that the mechanical arm 1 operates normally and pertains to system normal mode.

In step S2, if it is determined that the third digital power signal P3 is between the power threshold signal P3*a* and the power threshold signal P3*b*, the procedure proceeds to step S5. In step S5, whether the first digital power signal P1 is between the power threshold signal P1*a* and the power threshold signal P1*b* is determined through a comparison: if the determination is negative, the procedure proceeds to step S6. In step S6, whether the second digital power signal P2 is between the power threshold signal P2*a* and the power threshold signal P2*b* is determined through a comparison: if the determination is negative, this indicates that one power status of the control system is abnormal, and such abnormality pertains to system power supply error 3. In step S6, if it is determined that the second digital power signal P2 is between the power threshold signal P2*a* and the power threshold signal P2*b*, such abnormality pertains to system power supply error 2.

In step S5, if it is determined that the first digital power signal P1 is between the power threshold signal P1*a* and the power threshold signal P1*b*, the procedure proceeds to step S7. In step S7, whether the second digital power signal P2 is between the power threshold signal P2*a* and the power threshold signal P2*b* is determined through a comparison: if the determination is affirmative, this indicates that the third digital power signal P3 and the second digital power signal P2 of the control system may have one or two abnormal power statuses and such abnormalities pertain to system power supply error 1. The above abnormal power statuses refer to the situations where the values of the digital power signals are abnormal, and such abnormalities may be due to circuit fault or element failure on the power path or caused by abnormalities of a power supply.

In step S7, if it is determined that the second digital power signal P2 is not between the power threshold signal P2*a* and the power threshold signal P2*b*, this indicates that the mechanical arm 1 needs to enter the escape procedure and move in the escape mode.

Figure 7:
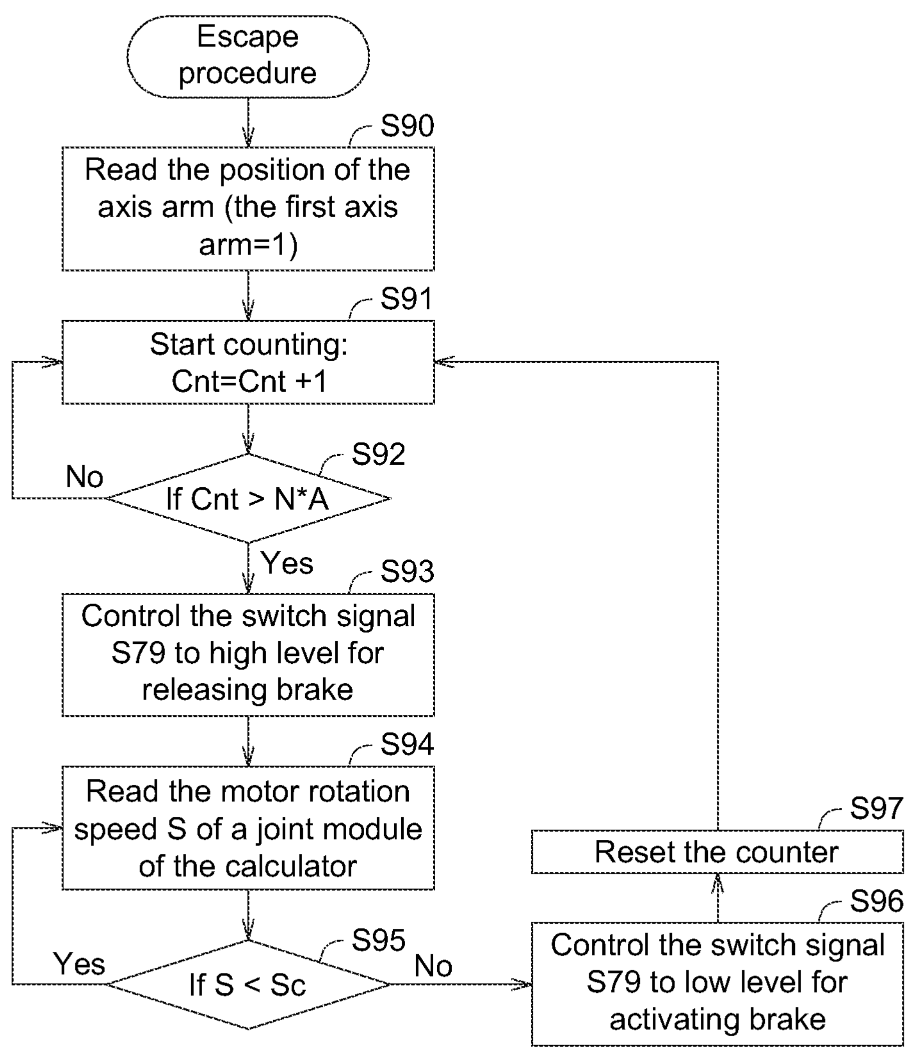
FIG. 7 is a flowchart of an escape procedure of the present invention for aiding a mechanical arm to escape.

Referring to FIG. 7, a flowchart of an escape procedure of the present invention for aiding a mechanical arm to escape is shown. The control circuit 77 (or the control box 4) determines, according to a computing result of the computing circuit 75, whether the mechanical arm 1 needs to enter an escape procedure. The escape procedure begins at step S90, the (self-) position of an axis arm 3 (or joint module 2) in the mechanical arm 1 can be obtained from a storage circuit by the control circuit 77 of the joint module 2. For instance, the storage circuit stores the joint module 2 as the code of the first joint module (such as 0001), that is, the code of the first axis arm 3. By the same analogy, the code of the second axis arm 3 (or the second joint module 2) can be 0010, and the code of the third axis arm 3 can be 0011.

In step S91, the counting is started, that is, Cnt=Cnt+1, and the obtained count is outputted, wherein counting can be performed by the control circuit 77 or another counter circuit (or counter), and the said arrangement is not subjected to the restrictions of the present invention. In step S92, whether the count Cnt is greater than N*A is determined, wherein N denotes the (self-) position of the axis arm 3; A denotes the initial setting of the delay ratio of each axis arm 3 (or each joint module 2) regarding the release of brake. For instance, the first axis arm 3 is without delay, therefore A=1, the delay of the second axis arm 3 is two times the delay of the first axis arm 3, therefore A=2. Or, the delay of the third axis arm 3 is four times the delay of the first axis arm 3, therefore A=4. In other words, the delay ratio of each axis arm 3 does not need to be identical and can be adjusted according to the load of each axis arm 3. For instance, the delay ratio of each axis arm 3 (or joint module 2) of a large-sized arm has a larger increment, and the delay ratio of each axis arm 3 of a small-sized arm has a smaller increment, so that the timings for releasing brakes can be staggered. Thus, when counting the first axis arm 3, the count is equivalent to Cnt>N*1; when counting the second axis arm 3, the count is equivalent to Cnt>N*2, and the rest can be obtained by the same analogy. If the count Cnt is not greater than N*A, the procedure returns to step S91 where counting continues.

In step S93, when the count Cnt is greater than N*A, the control circuit 77 controls the switch signal S79 to high level so that the brake of the electromagnetic valve 55 can be released and the operator can manually move the mechanical arm 1 to get away from the dead center. In step S94, for the mechanical arm 1 to escape from the dead center and meet the safety requirement for the operator, the motor rotation speed S of the joint module 2 is continuously read by the calculator 73 according to the encoder 51 and the decoder 71. In step S95, if the motor rotation speed S continues to be lower than a rotation speed threshold Sc, the procedure returns to step S94 where the motor rotation speed S is detected continuously; if the motor rotation speed S is higher than the rotation speed threshold Sc, the procedure proceeds to step S96. In step S96, the switch signal S79 is controlled to low level by the control circuit 77 so that the brake of the electromagnetic valve 55 can be activated. In step S97, the counter (that is, count Cnt) is reset. If (self-) brake of the axis arm 3 is activated due to safety concern before the axis arm 3 escape from the dead center, the procedure returns to step S91 where counting is resumed. Thus, through the design of step S90 to step S93, the timings for releasing the brakes of each axis arm 3 is staggered, so that the power consumption for escape can be reduced. Through the design of step S94 to step S96, the rotation speed of the motor module 53 is monitored and the braking force of the electromagnetic valve 55 is appropriately adjusted. That is, the braking force of the joint module 2 is adjusted, so that the operator can safely move the mechanical arm 1 off (or leave from) the dead center.

In other words, the control system controls the mechanical arm 1 to move in the first mode according to the first digital power signal P1 and the second digital power signal P2. When the mechanical arm 1 is unable to keep in the first mode, the control system (or the controller 22) controls the mechanical arm 1 to convert from the first mode to the second mode, cuts off the second digital power signal P2 and controls the mechanical arm 1 to enter in the second mode. In other words, when the control system is unable to control the mechanical arm 1 to keep in the first mode, the second digital power signal P2 is cut off. Then, the operator connects the third power circuit 65 with the second power supply 49, so that when the control system is unable to control the mechanical arm 1 to keep in the first mode, the third transform circuit 85 outputs the third digital power signal P3. The control system controls the mechanical arm 1 to move in the third mode according to the third digital power signal P3; after the controller 22 releases the braking force of the joint module 2 according to the third power VO3, that is, after the controller 22 controls the joint module 2 to release brake, the operator guides the mechanical arm 1 to move.

To summarize, the control system of a mechanical arm of the present invention includes a first transform circuit, a second transform circuit and a third transform circuit. The first transform circuit outputs a first digital power signal in a first mode of the mechanical arm. The second transform circuit outputs a second digital power signal in the first mode of the mechanical arm. When the control system is unable to control the mechanical arm to keep in the first mode, the second digital power signal is cut off. When the control system is unable to control the mechanical arm to keep in the first mode, the third transform circuit outputs a third digital power signal.

The control system controls the mechanical arm to operate in the first mode according to the first digital power signal and the second digital power signal. The control system cuts off the second digital power signal so that the mechanical arm is controlled to operate in the second mode. The control system controls the mechanical arm to operate in the third mode according to the third digital power signal so that the braking force of a joint module is released.

Moreover, the drive circuit board of a mechanical arm of the present invention includes a first power circuit, a second power circuit and a third power circuit. The first power circuit transmits a first power; the second power circuit transmits a second power; the mechanical arm moves in a first mode according to the first power and the second power. When the mechanical arm is unable to move in the first mode, the second power is cut off. When the mechanical arm is unable to keep in the first mode, the third power circuit transmits a third power.

When the mechanical arm moves in the first mode and the second mode, the first power circuit and the second power circuit are coupled to a first power supply. When the mechanical arm moves in the third mode, the third power circuit is coupled to a second power supply.

Each joint module of the mechanical arm includes a drive circuit board, on which a controller is disposed. When the mechanical arm moves in the first mode, the controller controls the braking force of the mechanical arm according to the second power. When the mechanical arm moves in the third mode, the controller controls the braking force of the mechanical arm according to the third power.

When the mechanical arm is unable to keep in the first mode, the controller controls the mechanical arm to change from the first mode to the second mode, an operator connects the third power circuit with a second power supply. After the controller controls the joint module to release brake according to the third power, the operator guides the mechanical arm to move.

While the invention has been described by way of example and in terms of the embodiment(s), it is to be understood that the invention is not limited thereto. On the contrary, it is intended to cover various modifications and similar arrangements and procedures, and the scope of the appended claims therefore should be accorded the broadest reasonable interpretation so as to encompass all such modifications and similar arrangements and procedures.

What is claimed is:

1. A control system of a mechanical arm, comprising:

a first transform circuit outputting a first digital power signal in a first mode of the mechanical arm;

a second transform circuit outputting a second digital power signal in the first mode of the mechanical arm, wherein when the control system is unable to control the mechanical arm to keep in the first mode, the second digital power signal is cut off; and a third transform circuit outputting a third digital power signal when the control system is unable to control the mechanical arm to keep in the first mode;

a signal output circuit coupled to a control circuit for outputting a switch signal according to a control signal;

a switch circuit coupled to the signal output circuit for receiving the switch signal to conduct or cut off a power path;

a decoder receiving a sensing signal, decoding the sensing signal, and outputting a decoded signal;

a calculator coupled to the decoder for receiving the decoded signal and generating a speed signal according to the decoded signal; and a computing circuit coupled to the calculator for receiving the speed signal and comparing the speed signal with a speed threshold signal to generate a speed computing signal;

wherein, the switch circuit conducts or cuts off the power path according to the speed computing signal.

2. The control system of the mechanical arm according to claim 1, wherein the control system controls the mechanical arm to operate in the first mode according to the first digital power signal and the second digital power signal; the control system cuts off the second digital power signal so that the mechanical arm is controlled to operate in a second mode; the control system controls the mechanical arm to operate in a third mode according to the first digital power signal and the third digital power signal so that a braking force of a joint module is released.

3. The control system of the mechanical arm according to claim 2, wherein the first mode is a normal mode, the second mode is a safe mode, and the third mode is an escape mode.

4. The control system of the mechanical arm according to claim 1, wherein the control system controls the mechanical arm to operate in the first mode according to the first digital power signal and the second digital power signal; the control system cuts off the second digital power signal so that the mechanical arm is controlled to operate in a second mode; the control system controls the mechanical arm to operate in a third mode according to the third digital power signal so that a braking force of a joint module is released.

5. A control system of a mechanical arm, comprising:

a first transform circuit outputting a first digital power signal in a first mode of the mechanical arm;

a second transform circuit outputting a second digital power signal in the first mode of the mechanical arm, wherein when the control system is unable to control the mechanical arm to keep in the first mode, the second digital power signal is cut off;

a third transform circuit outputting a third digital power signal when the control system is unable to control the mechanical arm to keep in the first mode;

a decoder receiving a sensing signal, decoding the sensing signal, and outputting a decoded signal;

a calculator coupled to the decoder for receiving the decoded signal and generating a speed signal according to the decoded signal;

a computing circuit coupled to the third transform circuit for receiving the third digital power signal and comparing the third digital power signal with a power threshold signal to generate a power computing signal and coupled to the calculator for receiving the speed signal and comparing the speed signal with a speed threshold signal to generate a speed computing signal; and a control circuit coupled to the computing circuit for controlling the mechanical arm to change from the first mode to a second mode according to the speed computing signal and cutting off the second digital power signal, and for controlling the mechanical arm to change from the second mode to a third mode according to the power computing signal.

6. The control system of the mechanical arm according to claim 5, wherein each of joint modules of the mechanical arm comprises the control system disposed on a drive circuit board.

* * * * *